(12) United States Patent
Huang et al.

(10) Patent No.: US 9,685,022 B2
(45) Date of Patent: Jun. 20, 2017

(54) IMAGE COMPENSATION CORRECTION METHOD AND BANKNOTE RECOGNITION AND DETECTION DEVICE

(71) Applicant: GRG Banking Equipment Co., Ltd., Guangzhou, Guangdong (CN)

(72) Inventors: Guoqiang Huang, Guangzhou (CN); Mengtao Liu, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/894,966

(22) PCT Filed: Jan. 23, 2014

(86) PCT No.: PCT/CN2014/071200
§ 371 (c)(1),
(2) Date: Nov. 30, 2015

(87) PCT Pub. No.: WO2015/003485
PCT Pub. Date: Jan. 15, 2015

(65) Prior Publication Data
US 2016/0110940 A1   Apr. 21, 2016

(30) Foreign Application Priority Data

Jul. 8, 2013   (CN) .......................... 2013 1 0285100

(51) Int. Cl.
*G07D 7/20*       (2016.01)
*G06T 7/00*       (2017.01)
*H04N 5/3745*   (2011.01)

(52) U.S. Cl.
CPC ......... *G07D 7/2025* (2013.01); *G06T 7/0002* (2013.01); *G07D 7/2008* (2013.01); *H04N 5/37455* (2013.01)

(58) Field of Classification Search
None
See application file for complete search history.

(56) References Cited

U.S. PATENT DOCUMENTS 5,047,861 A  *  9/1991  Houchin .............. H04N 5/3655
                                                                    348/247
5,949,903 A      9/1999  Outa et al.
(Continued)

FOREIGN PATENT DOCUMENTS

CN           1464736 A     12/2003
CN       201444313 U       4/2010
(Continued)

OTHER PUBLICATIONS

Written Opinion, dated Apr. 28, 2014, from a corresponding International Application No. PCT/CN2014/071200.
(Continued)

*Primary Examiner* — Michelle Hausmann
(74) *Attorney, Agent, or Firm* — Wolf, Greenfield & Sacks, P.C.

(57) ABSTRACT

An image compensation correction method and a banknote recognition and detection device. The image compensation correction method is applied to the banknote recognition and detection device. The banknote recognition and detection device comprises: a micro controller; a programmable logic device which is connected to the micro controller; an AD chip, a drive circuit and a static random access memory which are connected to the programmable logic device respectively; and a contact image sensor which is connected to the AD chip and the drive circuit respectively. A compensation correction lookup table is pre-stored in the static random access memory, and the programmable logic device can acquire banknote compensation correction data corresponding to a banknote image pixel point by accessing the static random access memory, and send same to the micro (Continued)

controller. Therefore, the micro controller acquires banknote compensation correction data directly from the programmable logic device rather than performing compensation correction on the obtained banknote image pixel point any more, thereby improving the system performance of the micro controller, and thus improving the work efficiency of the banknote recognition and detection device.

6 Claims, 3 Drawing Sheets

(56) References Cited

U.S. PATENT DOCUMENTS

| | | | | |
|---|---|---|---|---|
| 6,642,503 | B2* | 11/2003 | Kummaraguntla | G01J 1/44 250/214 P |
| 8,872,920 | B2* | 10/2014 | Kakinami | G06T 7/002 348/148 |
| 9,001,251 | B2* | 4/2015 | Smith | H01L 27/14641 257/290 |
| 9,024,243 | B2* | 5/2015 | Rostaing | H04N 5/35536 250/208.1 |
| 9,445,021 | B1* | 9/2016 | Linzer | H04N 5/3653 |
| 2002/0054385 | A1 | 5/2002 | Fukawa | |
| 2003/0038983 | A1 | 2/2003 | Tanabe et al. | |
| 2003/0057053 | A1 | 3/2003 | Kano et al. | |
| 2003/0112480 | A1* | 6/2003 | Chiu | H04N 1/4076 358/504 |
| 2004/0169846 | A1* | 9/2004 | Ross | G07D 7/122 356/71 |
| 2006/0291713 | A1* | 12/2006 | Moriya | G01N 21/8851 382/147 |
| 2010/0253985 | A1 | 10/2010 | Kurimoto | |

FOREIGN PATENT DOCUMENTS

| | | |
|---|---|---|
| CN | 102054311 A | 5/2011 |
| CN | 102105911 A | 6/2011 |
| CN | 102142168 A | 8/2011 |
| CN | 102143298 A | 8/2011 |
| CN | 102169608 A | 8/2011 |
| CN | 202134053 U | 2/2012 |
| CN | 202217339 U | 5/2012 |
| CN | 102568081 A | 7/2012 |
| CN | 202534042 U | 11/2012 |
| CN | 102890840 A | 1/2013 |
| CN | 202694451 U | 1/2013 |
| CN | 102930636 A | 2/2013 |
| CN | 202854945 U | 4/2013 |
| CN | 103080999 A | 5/2013 |
| CN | 103108107 A | 5/2013 |
| CN | 203038358 U | 7/2013 |
| CN | 103310528 A | 9/2013 |
| EP | 0078708 B1 | 5/1983 |
| JP | 2003067805 A | 3/2003 |
| KR | 20100022187 A | 3/2010 |
| WO | WO 2004/008380 A1 | 1/2004 |

OTHER PUBLICATIONS

Extended European Search Report, dated Jul. 5, 2016, from related European Application No. 14822362.1.
Chinese Office Action, dated Dec. 25, 2014, from corresponding or related Chinese Application No. 201310285100.9.
International Search Report, dated Apr. 17, 2014, from corresponding or related International Application No. PCT/CN2014/071200.
Gao: "Design and Realization Based on DSP+FPGA Image Acquisition System," Nanjing University of Science and Technology; Master's thesis; Chapter 3 pp. 11-18.
Electronic Products China: "The Signal Reading and Compensation Technique of Contact Image Sensor," http://www.epc.com.cn; (2002).

* cited by examiner

IMAGE COMPENSATION CORRECTION METHOD AND BANKNOTE RECOGNITION AND DETECTION DEVICE

This application is the national stage of International Application No. PCT/CN2014/071200, titled "IMAGE COMPENSATION CORRECTION METHOD AND BANKNOTE RECOGNITION AND DETECTION DEVICE," filed on Jan. 23, 2014 which claims priority to Chinese Patent Application No. 201310285100.9, entitled "IMAGE COMPENSATION CORRECTION METHOD AND BANKNOTE RECOGNITION AND DETECTION DEVICE", filed on July 8, filed with the Chinese State Intellectual Property Office on May 23, 2013, the entire disclosures of both applications are incorporated herein by reference.

FIELD

The disclosure relates to the technical field of banknote recognition and banknote verification, particularly relates to a method for compensating and correcting an image, and a device for recognizing and verifying banknotes.

BACKGROUND

A contact image sensor (CIS) is a most common optical sensor used in a device for recognizing and verifying banknotes. The CIS is normally used to recognize a denomination of a banknote, front and back sides of the banknote, and used to identify authenticity of the banknote. Multiple sections are spliced inside a currently common CIS. Due to factors such as fabrication and the splicing process, there are discrepancies among light-sensitive units in various sections of the CIS, so various sections of an original image directly collected by the CIS are different in brightness, which affects the recognizing the banknote and identifying authenticity of the banknote performed by the device for recognizing and verifying banknotes. Thus the original image collected by the CIS needs to be compensated and corrected.

In a conventional systematic solution, the compensation and correction for the original image collected by the CIS is generally performed by a micro control unit (MCU) in the device for recognizing and verifying banknotes. Since the MCU also manages main tasks such as a banknote recognition algorithm, and information communication as well, a system performance of the MCN may be affected if the MCU spends too much time on compensation and correction for the CIS, thus affecting operation efficiency of the device for recognizing and verifying banknotes.

Therefore, a solution for improving the system performance of the MCU while ensuring the MCU to compensate and correct the original image collected by the CIS is highly required.

SUMMARY

In view of this, a method for compensating and correcting an image and a device for recognizing and verifying banknotes are provided according to embodiments of the disclosure, to improve a system performance of a MCU while ensuring the MCN to compensate and correct an original image collected by a CIS, so as to improve operation efficiency of the device for recognizing and verifying banknotes.

A method for compensating and correcting an image, applied to a device for recognizing and verifying banknotes including a micro control unit, a programmable logic device connected to the micro control unit, an analog to digital (AD) chip, a drive circuit, and a static random access memory each connected to the programmable logic device, and a contact image sensor connected to the AD chip and the drive circuit respectively, where the static random access memory pre-stores a lookup table for compensation and correction; the method includes:

receiving, by the programmable logic device, a first configuration instruction output by the micro control unit, and controlling, by the programmable logic device, the drive circuit to drive the contact image sensor to collect first banknote image pixels;

converting, by the AD chip, the first banknote image pixels into second banknote image pixels through analog to digital conversion; and acquiring, by the programmable logic device, the second banknote image pixels, using values of the second banknote image pixels as address data, accessing the lookup table for compensation and correction pre-stored in the static random access memory, finding banknote compensation and correction data corresponding to the second banknote image pixels, and transmitting the banknote compensation and correction data to the micro control unit.

Optionally, a process of creating the lookup table for compensation and correction pre-stored in the static random access memory includes:

receiving, by the programmable logic device, a second configuration instruction output by the micro control unit, and controlling, by the programmable logic device, the drive circuit to drive the contact image sensor to collect first original image pixels;

converting, by the AD chip, the first original image pixels into second original image pixels through analog to digital conversion;

receiving, recording and storing, by the programmable logic device, the second original image pixels, and transmitting the second original image pixels to the micro control unit; and receiving, by the micro control unit, the second original image pixels, acquiring compensation and correction data corresponding to the second original image pixels according to a compensation and correction formula, creating the lookup table for compensation and correction with the compensation and correction data, and storing the lookup table for compensation and correction into the static random access memory.

Optionally, the collecting, by the contact image sensor, first original image pixels; and converting, by the AD chip, the first original image pixels into second original image pixels through analog to digital conversion, includes:

acquiring, by the contact image sensor, black-level outputs of the first original image pixels by scanning black calibration paper, and converting, by the AD chip, the black-level outputs of the first original image pixels into black-level outputs of the second original image pixels through analog to digital conversion; and acquiring, by the contact image sensor, white-level outputs of the first original image pixels by scanning white calibration paper, and converting, by the AD chip, the white-level outputs of the first original image pixels into white-level outputs of the second original image pixels through analog to digital conversion.

Optionally, the receiving and recording, by the programmable logic device, the second original image pixels, includes:

receiving, by the programmable logic device, the black-level outputs of the second original image pixels, and recording the black-level outputs of the second original image pixels as SB(i), i=0~N−1, where N is a total number of the original pixels of the contact image sensor, and i is a serial number of the original pixel; and receiving, by the programmable logic device, the white-level outputs of the second original image pixels and recording the white-level outputs of the second original image pixels as SW(i), i=0~N−1, where N is a total number of the original pixels of the contact image sensor, and i is a serial number of the original pixel.

Optionally, the receiving, by the micro control unit, the second original image pixels, acquiring compensation and correction data corresponding to the second original image pixels according to a compensation and correction formula, and creating the lookup table for compensation and correction with the compensation and correction data, includes:

receiving, by the micro control unit, the black-level outputs SB(i) of the second original image pixels and the white-level outputs SW(i) of the second original image pixels;

acquiring, by the micro control unit, N compensation and correction coefficients K(i) according to a coefficient calculation formula K(i)=[SW(i)−SB(i)]/255; and acquiring, by the micro control unit, all compensation and correction data corresponding to the second original image pixels according to a compensation and correction formula Y(i)=K(i)*[X(i)−SB(i)], and creating, by the micro control unit, the lookup table for compensation and correction with the compensation and correction data, where X(i) represents a value for the original image, and Y(i) represents a corrected value.

Optionally the method for compensating and correcting an image further includes:

recognizing, by the micro control unit, the banknote according to the banknote compensation and correction data, and transmitting a banknote recognition result to an upper computer connected to the micro control unit.

A device for recognizing and verifying banknotes, includes:

a micro control unit, an AD chip, configured to perform analog to digital conversion on received data;

a drive circuit;

a contact image sensor which is connected to the AD chip and the drive circuit respectively, and is configured to be driven by the drive circuit to collect pixels of an image, and transmit the pixels of the image to the AD chip;

a static random access memory pre-storing a lookup table for compensation and correction; and a programmable logic device which is connected to the micro control unit, the AD chip, the drive circuit and the static random access memory respectively, and is configured to receive a first configuration instruction output by the micro control unit, control the drive circuit to drive the contact image sensor to collect first banknote image pixels, acquire second banknote image pixels obtained by the AD chip through performing analog to digital conversion on the first banknote image pixels, use values of the second banknote image pixels as address data, access the lookup table for compensation and correction pre-stored in the static random access memory, find banknote compensation and correction data corresponding to the second banknote image pixels, and transmit the banknote compensation and correction data to the micro control unit.

Optionally, the AD chip is configured to convert first original image pixels into second original image pixels through analog to digital conversion;

the programmable logic device is configured to receive a second configuration instruction output by the micro control unit, control the drive circuit to drive the contact image sensor to collect the first original image pixels; and receive, record and store the second original image pixels, and transmit the second original image pixels to the micro control unit; and the micro control unit is configured to receive the second original image pixels, acquire compensation and correction data corresponding to the second original image pixels according to a compensation and correction formula, create the lookup table for compensation and correction with the compensation and correction data, and store the lookup table for compensation and correction into the static random access memory.

Optionally, the contact image sensor is configured to acquire black-level outputs of the first original image pixels by scanning black calibration paper; and acquire white-level outputs of the first original image pixels by scanning white calibration paper.

Optionally, the AD chip is configured to convert the black-level outputs of the first original image pixels into black-level outputs of the second original image pixels through analog to digital conversion, and is configured to convert the white-level outputs of the first original image pixels into white-level outputs of the second original image pixels through analog to digital conversion.

Optionally, the programmable logic device is configured to receive the black-level outputs of the second original image pixels, and record the black-level outputs of the second original image pixels as SB(i), i=0~N−1, where N is a total number of the original pixels of the contact image sensor, and i is a serial number of the original pixel; and receive the white-level outputs of the second original image pixels and record the white-level outputs of the second original image pixels as SW(i), i=0~N−1, where N is a total number of the original pixels of the contact image sensor, and i is a serial number of the original pixel.

Optionally, the micro control unit is configured to receive the black-level outputs SB(i) of the second original image pixels and the white-level outputs SW(i) of the second original image pixels; acquire N compensation and correction coefficients K(i) according to a coefficient calculation formula K(i)=[SW(i)−SB(i)]/255; and acquire compensation and correction data corresponding to the second original image pixels according to a compensation and correction formula Y(i)=K(i)*[X(i)−SB(i)] to create the lookup table for compensation and correction, where X(i) represents a value of the original image, and Y(i) represents a corrected value.

Optionally, the device for recognizing and verifying banknotes further includes an upper computer which is connected to the micro control unit and is configured to receive a banknote recognition result output by the micro control unit.

According to the above technical solutions, a method for compensating and correcting an image, and a device for recognizing and verifying banknotes are provided. The method for compensating and correcting an image is applied to a device for recognizing and verifying banknote. The device for recognizing and verifying banknote includes a micro control unit, a programmable logic device connected to the micro control unit, an AD chip, a drive circuit, and a static random access memory each connected to the programmable logic device, and a contact image sensor connected to the AD chip and the drive circuit respectively. In the provided device for recognizing and verifying banknote, the static random access memory pre-stores a lookup table for compensation and correction. The programmable logic device can obtain banknote compensation and correction data corresponding to banknote image pixels, and transmit the banknote compensation and correction data to the micro control device. Thus, in the provided device for recognizing and verifying banknote, the micro control device no longer compensates or corrects banknote image pixels obtained. Instead, the micro control device directly acquires banknote compensation and correction data from the programmable logic device. The micro control device merely recognizes the banknote according to the banknote compensation and correction data. Thus, compensation and correction of the banknote is no longer performed by the micro control device, thereby improving a system performance of the micro control device, and improving operation efficiency of the device for recognizing and verifying banknote.

BRIEF DESCRIPTION OF THE DRAWINGS

For clarity of the technical solutions in the embodiments of the present disclosure or technical solutions in conventional technology, drawings involved in the embodiments of the present disclosure or in the conventional technology are briefly describes as follows. Apparently, the drawings described below are a few embodiments, and persons of ordinary skill in the art can derive other drawings according to the drawings without any creative work.

DETAILED DESCRIPTION

Technical solutions of the embodiments of the present disclosure will be illustrated completely and clearly with the drawings for the embodiments of the disclosure. Apparently, the described embodiments are merely a few rather than all embodiments of the present disclosure. All other embodiments obtained by persons of ordinary skill in the art based on the embodiments of the present disclosure without creative work shall fall within the protection scope of the present disclosure.

Figure 1:
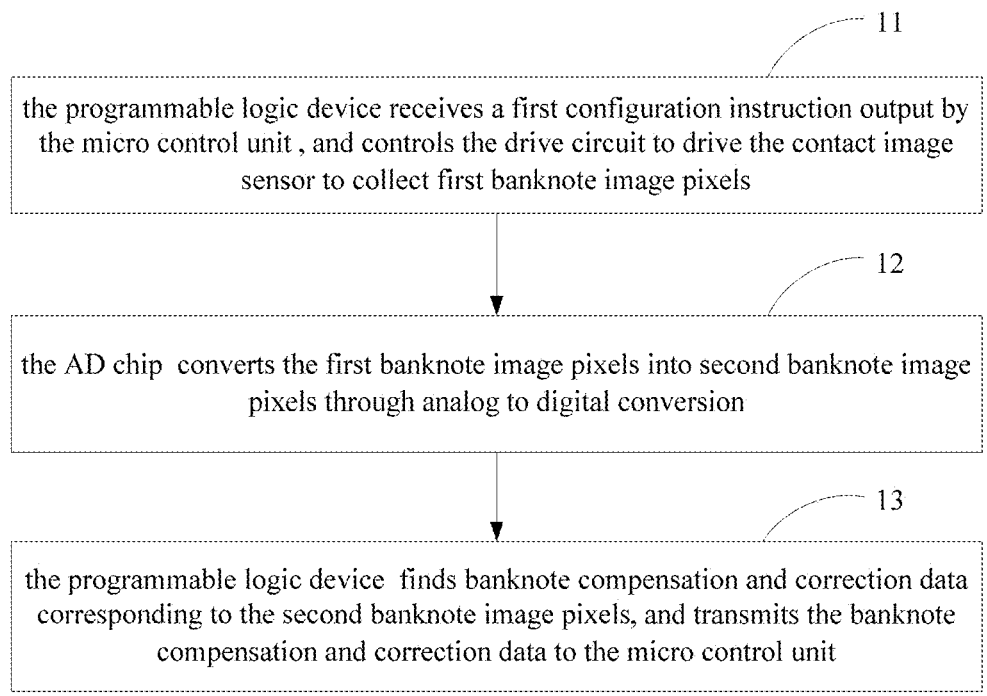
FIG. 1 is a flow chart of a method for compensating and correcting an image according to an embodiment of the disclosure.
Figure 2:
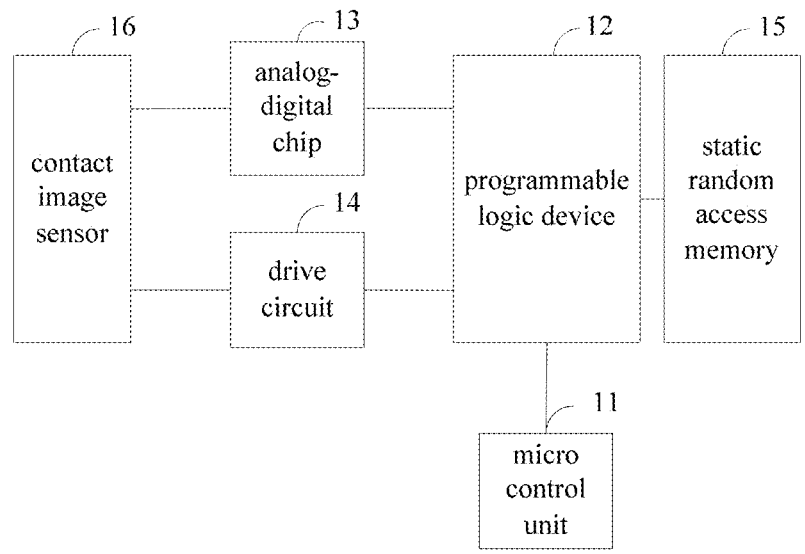
FIG. 2 is a schematic structural diagram of a device for recognizing and verifying banknotes according to an embodiment of the disclosure.

FIG. 1 is a flow chart of a method for compensating and correcting an image. The method for compensating and correcting an image is applied to a device for recognizing and verifying banknotes. FIG. 2 shows a schematic structural diagram of a device for recognizing and verifying banknotes. The device for recognizing and verifying banknotes includes: a micro control unit 11, a programmable logic device 12 (Field-Programmable Gate Array, FPGA) connected to the micro control unit 11, an analog to digital (AD) chip 13, a drive circuit 14 and a static random access memory (Static RAM, SRAM) 15, which are each connected to the programmable logic device 12, a contact image sensor (CIS) 16 which is connected to the AD chip 13 and the drive circuit 14 respectively, where the static random access memory 15 pre-stores a lookup table for compensation and correction. The method includes following steps S11 to S13.

In step S11, the programmable logic device 12 receives a first configuration instruction output by the micro control unit 11, and controls the drive circuit 14 to drive the contact image sensor 16 to collect first banknote image pixels.

When the device for recognizing and verifying banknotes verifies a banknote, the micro control unit 11 outputs the first configuration instruction to the programmable logic device 12, the programmable logic device 12 receives the first configuration instruction, enters into a mode for recognizing and verifying banknotes and then outputs a driving signal to the drive circuit 14, to control the drive circuit 14 to drive the contact image sensor 16 to collect first banknote image pixels.

In step S12, the AD chip 13 converts the first banknote image pixels into second banknote image pixels through analog to digital conversion.

The first banknote image pixels are analog voltage signals, and the second banknote image pixels are digital signals.

In step S13, the programmable logic device 12 finds banknote compensation and correction data corresponding to the second banknote image pixels, and transmits the banknote compensation and correction data to the micro control unit 11.

The programmable logic device 12 acquires the second banknote image pixels, uses values of the second banknote image pixels as address data, accesses the lookup table for compensation and correction pre-stored in the static random access memory 15, finds the banknote compensation and correction data corresponding to the second banknote image pixels, and transmits the banknote compensation and correction data to the micro control unit 11.

It can be understood that one banknote has multiple banknote image pixels, and scanning the banknote by the contact image sensor 16 is for collecting the banknote image pixels.

According to the above technical solutions, different from the condition in conventional technology, compensation and correction of the acquired banknote image pixels are no longer performed by the micro control unit 11. Instead, the micro control unit 11 directly acquires the banknote compensation and correction data from the programmable logic device 12, and the micro control unit 11 merely recognizes the banknote according to the banknote compensation and correction data. Therefore, compensation and correction of the acquired banknote image pixels are no longer performed by the micro control unit 1, thereby greatly reducing the amount of data to be processed. With the method for compensating and correcting an image according to the embodiment of the disclosure, not only a system performance of the micro control unit 11 is improved, but also a speed for processing the banknote image pixels is improved, thereby improving operation efficiency of the device for recognizing and verifying banknotes.

It is should be noted that the programmable logic device 12 may transmit a single line of acquired banknote compensation and correction data to the micro control unit 11. Alternatively, the programmable logic device 12 may cache acquired banknote compensation and correction data, and then transmit multiple lines of banknote compensation and correction data to the micro control unit 11.

Continually receiving single lines of banknote compensation and correction data makes the micro control unit 11 always in a data processing state, which affects a system performance of the micro control unit 11. To further optimize the system performance of the micro control unit 11, the programmable logic device 12 may cache multiple lines of banknote compensation and correction data, and then transmit the multiple lines of banknote compensation and correction data together to the micro control unit 11. The number of the lines of the banknote compensation and correction data transmitted to the micro control unit 11 by the programmable logic device 12 can be modified by modifying a program in the programmable logic device 12. The number of the lines of the transmitted banknote compensation and correction data may be determined as desired, and is not limited according to the disclosure herein.

The programmable logic device 12 keeps transmitting the banknote compensation and correction data to the micro control unit 11 while the micro control unit 11 recognizes the banknote according to the acquired banknote compensation and correction data, i.e., the acquirement of the banknote compensation and correction data by the programmable logic device 12 and the recognition of the banknote by the micro control unit 11 are performed simultaneously, and this processing manner is called as "ping-pong cache". It is can be seen that the "ping-pong cache" improves the operation efficiency of the device for recognizing and verifying banknotes.

Figure 3:
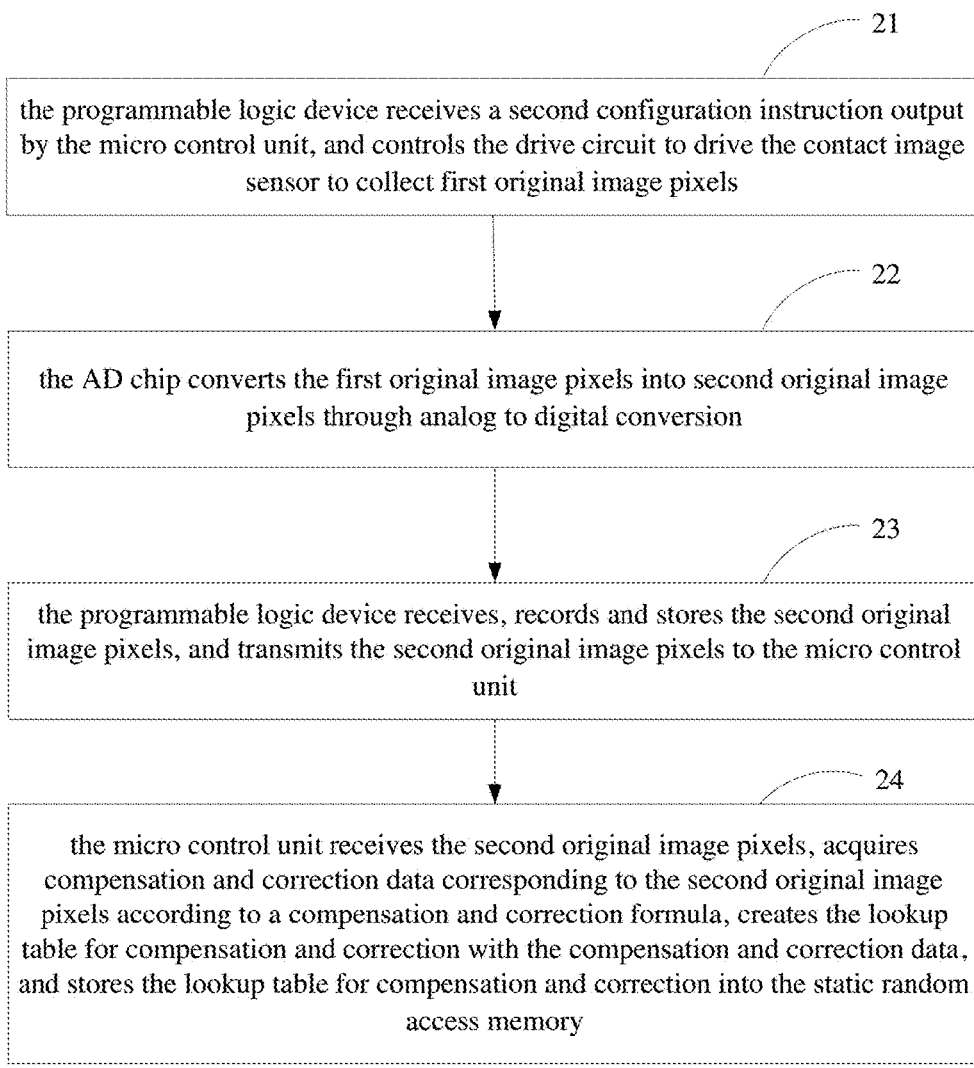
FIG. 3 is a flow chart of a process of creating a lookup table for compensation and correction pre-stored in a static random access memory according to an embodiment of the disclosure.

FIG. 3 is a flow chart of a process for creating a lookup table for compensation and correction pre-stored in a static random access memory according to an embodiment of the disclosure. The process includes following steps S21 to S24.

In step S21, the programmable logic device 12 receives a second configuration instruction output by the micro control unit 11, and controls the drive circuit 14 to drive the contact image sensor 16 to collect first original image pixels.

For creating a lookup table for compensation and correction, the programmable logic device 12 receives a second configuration instruction output by the micro control unit 11. Then the programmable logic device 12 enters an original image collecting mode, and outputs a drive signal to control the drive circuit 14 to drive the contact image sensor 16 to collect first original image pixels.

It can be understood for persons of skills in the art that through scanning black calibration paper, the contact image sensor 16 can acquire black-level outputs of the first original image pixels, i.e., black-level outputs for each pixel of the contact image sensor 16; and through scan white calibration paper, the contact image sensor 16 can acquire white-level outputs of the first original image pixels, i.e., white-level outputs of each pixel of the contact image sensor 16.

In step S22, the AD chip 13 converts the first original image pixels into second original image pixels through analog to digital conversion The AD chip 13 converts the black-level outputs of the first original image pixels into black-level outputs of second original image pixels through analog to digital conversion.

The AD chip 13 converts the white-level outputs of the first original image pixels into white-level outputs of second original image pixels through analog to digital conversion.

In step S23, the programmable logic device 12 receives, records and stores the second original image pixels, and transmits the second original image pixels to the micro control unit 11.

The programmable logic device 12 receives the black-level outputs of the second original image pixels, and records the black-level outputs of the second original image pixels as SB(i), i=0~N−1, (where N is a total number of the original pixels of the contact image sensor, and i is a serial number of the original pixel).

The programmable logic device 12 receives the white-level outputs of the second original image pixels and records the white-level outputs of the second original image pixels as SW(i), i=0~N−1, (where N is a total number of the original pixels of the contact image sensor, and i is a serial number of the original pixel).

In step S24, the micro control unit 11 receives the second original image pixels, acquires compensation and correction data corresponding to the second original image pixels according to a compensation and correction formula, creates the lookup table for compensation and correction with the compensation and correction data, and stores the lookup table for compensation and correction into the static random access memory 15.

The micro control unit 11 receives the black-level outputs of the second original image pixels as SB(i), and the white-level outputs of the second original image pixels as SW(i).

The micro control unit 11 acquires N compensation and correction coefficients K(i) according to a coefficient calculation formula K(i)=[SW(i)−SB(i)]/255.

The micro control unit 11 acquires all compensation and correction data corresponding to the second original image pixels according to a compensation and correction formula Y(i)=K(i)*[X(i)−SB(i)], (where X(i) represents a value for the original image, and Y(i) represents a corrected value), creates the lookup table for compensation and correction with the compensation and correction data, and stores the lookup table for compensation and correction in the static random access memory 15.

It should be noted that the micro control unit 11 is not directly connected to the static random access memory 15, and needs to store the formed lookup table for compensation and correction into the static random access memory 15 through the programmable logic device 12. Therefore, affection on a system performance of the micro control unit 11, caused by frequent data exchange between the micro control unit 11 and the static random access memory 15 resulted from direct connection of the micro control unit 11 and the static random access memory 15, is effectively avoided.

The process that the micro control unit 11 acquires all compensation and correction data corresponding to the second original image pixels according to a compensation and correction formula Y(i)=K(i)×[X(i)−SB(i)] (X(i) represents a value for the original image, and Y(i) represents a corrected value), and creates the lookup table for compensation and correction, is as follows.

X(i) is in a range of 0-255, and in a case that i is a fixed value, corresponding values of Y(i) may be acquired through traversing 256 input values. For example, in a case that i is equal to 0, K(0) and SB(0) can be calculated according to step S23 and step S24, values of X(0) are input when i traverses from 0 to 255, then 256 corresponding values of Y(0) may be acquired, which are all compensation and correction data with respect to the first pixel X(0). Similarly, by increasing i by one every time, compensation and correction data corresponding to all pixels of the contact image sensor 16 can be acquired, so that an complete lookup table for compensation and correction with respect to the contact image sensor 16 is obtained.

For example, all possible compensation and correction values y(n, x) can be pre-calculated according to the compensation and correction formula $Y(i)=K(i)\times[X(i)-SB(i)]$, where n represent a nth pixel (n is different from i, n represents an nth pixel, and i is a number of an original pixel, which starts from 0, i.e., n=i+1), x (equivalent to the foregoing X(i) represents a value for the original image. The lookup table may be completed in an ascending order of n and x, and the possible compensation and correction values may be serialized and stored in the static random access memory 15 in an order of the lookup table.

The lookup table for compensation and correction with respect to N pixels may be as follows.

| y(1, 0) | y(1, 1) | y(1, 2) | ... y(1, 253) | y(1, 254) | y(1, 255) |
|---|---|---|---|---|---|
| y(2, 0) | y(2, 1) | y(2, 2) | ... y(2, 253) | y(2, 254) | y(2, 255) |
| ... | ... | ... | ... ... | ... | ... |
| y(N − 1, 0) | y(N − 1, 1) | y(N − 1, 2) | ... y(N − 1, 253) | y(N − 1, 254) | y(N − 1, 255) |
| y(N, 0) | y(N, 1) | y(N, 2) | ... y(N, 253) | y(N, 254) | y(N, 255) |

After the programmable logic device 12 receives the first configuration instruction and enters into the mode for recognizing and verifying banknotes, it is assuming that the base address of the static random access memory 15 is Base0, and a current output value of a tenth pixel of the contact image sensor 16 is 50, then an address of the static random access memory 15 which is accessed by the programmable logic device 12 is (Base0+256×9+50), i.e., content of y(10, 50) is a compensated and corrected value for the tenth pixel. Similarly, compensations and corrections for all pixels can be accomplished.

Since all possible 256 gray input values of x are traversed, the table is complete, and can represent all possible output results. Thus in a case that a system of the device for recognizing and verifying banknotes operates in the recognition mode, the image is compensated and corrected by a non-time-consuming way in which the programmable logic device accesses and reads the static random access memory 15, instead of time-consuming conventional multiplication calculation of the micro control unit 11. Taking IS61WV20488BLL as an example, one read operation can be finished in 10 ns, which occupies little system time. Meanwhile, with the device for recognizing and verifying banknotes according to the disclosure, a conventional way, in which the micro control unit 11 performs serial compensation after the scan, is broken through. After the scanning of the banknote, the compensated image can be synchronously output, which occupies little time of the micro control unit 11, thus the micro control unit 11 can concentrate on the banknote recognition algorithm and communication of the recognition result. With ping-pang cache, preprocessing for the correction of the image and the banknote recognition algorithm can be performed in parallel, real-time and high-speed processing ability is outstanding, and the system performance of the micro control unit 11 is greatly improved, thereby improving operation efficiency of the device for recognizing and verifying banknotes.

Figure 4:
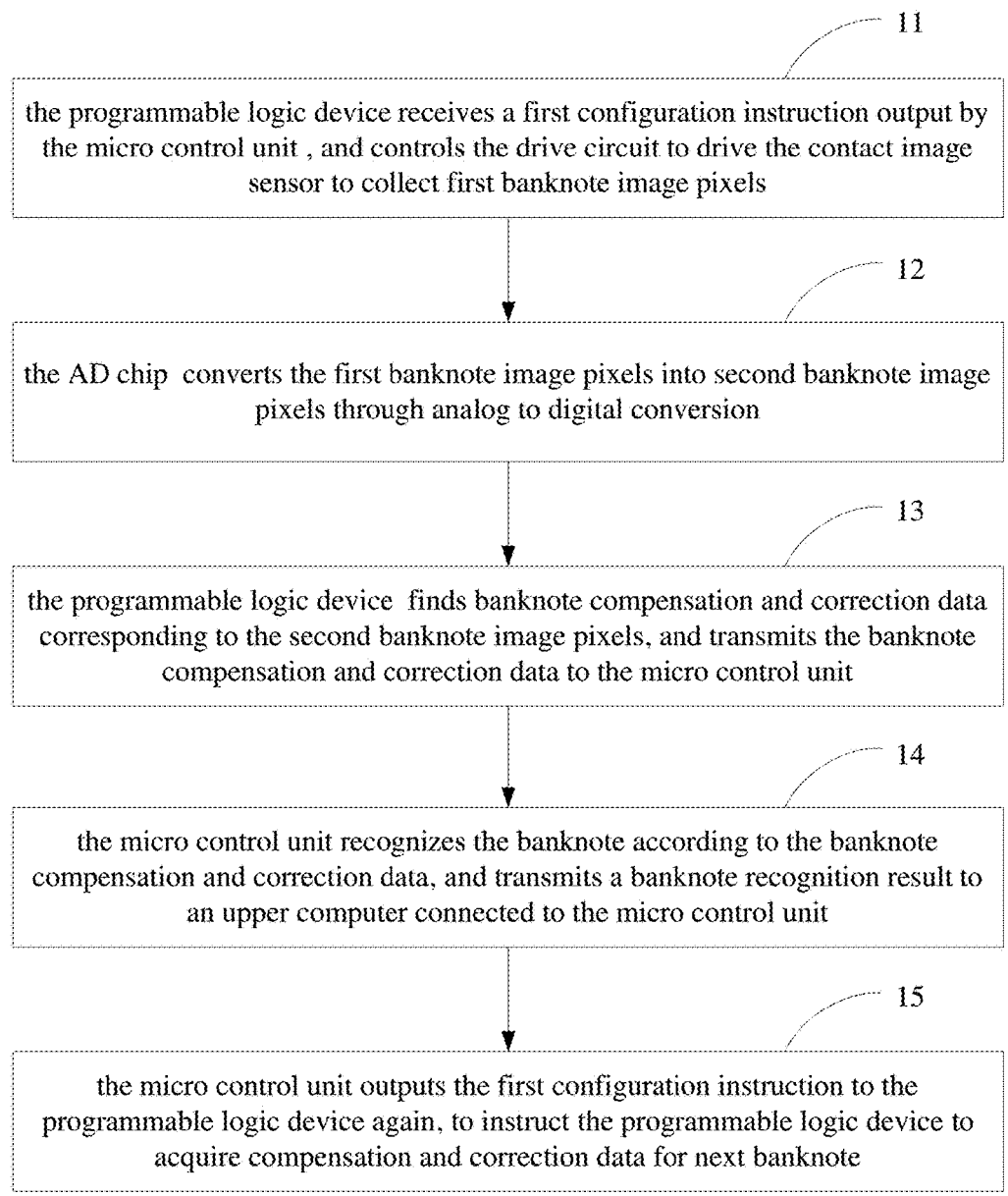
FIG. 4 is a flow chart of a method for compensating and correcting an image according to an embodiment of the disclosure.

Based on FIG. 1, FIG. 4 is a flow chart of a method for compensating and correcting an image according to an embodiment of the disclosure, and the method may further include following steps S14 to S15.

In step S14, the micro control unit 11 recognizes the banknote according to the banknote compensation and correction data, and transmits a banknote recognition result to an upper computer connected to the micro control unit 11.

In step S15, the micro control unit 11 outputs the first configuration instruction to the programmable logic device 12 again, to instruct the programmable logic device 12 to acquire compensation and correction data for next banknote.

Corresponding to above method embodiments, a device for recognizing and verifying banknotes is provided according to an embodiment of the disclosure, as shown in FIG. 2. The device for recognizing and verifying banknotes includes:

a micro control unit 11, a programmable logic device 12 (Field-Programmable Gate Array, FPGA), an AD chip 13, a drive circuit 14, a static random access memory (Static RAM, SRAM) 15 and a contact image sensor (CIS)16.

Optionally, the micro control unit 11 is a digital signal processor (DSP).

The AD chip 13 is configured to perform analog to digital conversion on received data. The AD chip 13 according to an embodiment of the disclosure may be AD9822.

The static random access memory 15 pre-stores a lookup table for compensation and correction. A process of creating the lookup table for compensation and correction is as shown in FIG. 3, and is not described herein.

The contact image sensor 16 is connected to the AD chip 13 and the drive circuit 14 respectively, and is configured to be driven by the drive circuit 14 to collect pixels of an image, and transmit the pixels of the image to the AD chip 13.

The contact image sensor 16 is used in a scanner, and is a component where light-sensing units are densely arranged, and light-sensing units directly collect information of light reflected by an object being scanned. According to an embodiment of the disclosure, the contact image sensor 16 is mainly configured to scan a banknote, to collect pixels of the image of the banknote.

The drive circuit 14 provides a LED constant current driver, a line-scanning synchronization signal, and a clock signal for synchronously outputting pixel-points, etc. controlled by the contact image sensor 16, the drive circuit 14 drives the contact image sensor 16 to perform photoelectric conversion on a scanned light signal, and output a measurable analog signal.

The programmable logic device 12 is connected to the micro control unit 11, the AD chip 13, the drive circuit 14 and the static random access memory 15 respectively, and is configured to receive a first configuration instruction output by the micro control unit 11, control the drive circuit 14 to drive the contact image sensor 16 to collect first banknote image pixels, acquire second banknote image pixels obtained by the AD chip 13 through performing analog to digital conversion on the first banknote image pixels, use values of the second banknote image pixels as address data, access a lookup table for compensation and correction pre-stored in the static random access memory 15, find banknote compensation and correction data corresponding to the second banknote image pixels, and transmit the banknote compensation and correction data to the micro control unit 11.

It is should be noted that the first banknote image pixels collected by the contact image sensor 16 are analog voltage signals, the second banknote image pixels obtained by the AD chip 13 performing analog to digital conversion on the first banknote image pixels are digital signals. The AD chip 13 according to an embodiment of the disclosure is mainly configured for analog to digital conversion.

The programmable logic device 12 performs data communications with the static random access memory 15 and the micro control unit 11 respectively through a parallel bus.

In the programmable logic device 12 are provided with functional modules such as a clock management module, a CIS driving control module, an AD configuration module, a SRAM control module and an image caching module, and the programmable logic device 12 achieves cooperation among the function modules through internal programming.

The clock management module provides clock signals for function modules in the programmable logic device 12, the CIS driving control module is capable of outputting signals such as a resolution setting signal, a LED constant current driver, a line-scanning synchronization signal and a clock signal for synchronously outputting pixel-points, to the drive circuit 14. The AD configuration module is for configuring an analog to digital conversion device and implements configurations of internal registers such as a multi-channel operation mode, a programmable gain controller, a programmable offset device, and a reference voltage, for the AD chip 13. The SRAM control module performs reading and writing accesses to the static random access memory 15, and implements looking up the lookup table for compensation and correction data and a real-time compensation and correction function oft an original image for the contact image sensor 16. The image caching module splices image data output by the AD chip 13, caches multiple lines of data and transmit the multiple lines of data to the micro control unit 11 to form the an image of the banknote.

The principles for the device for recognizing and verifying banknotes as shown in FIG. 2 and components thereof are the same as those described in the foregoing method embodiments, and are not repeated herein.

The device for recognizing and verifying banknotes based on FIG. 2 may further includes:

an upper computer connected to the micro control unit 11 and configured to receive a banknote recognition result output by the micro control unit 11.

The micro control unit 11 performs data interaction through serial ports.

In summary, in a case that the device for recognizing and verifying banknotes according to the embodiment of the disclosure verifies the banknote, the conventional compensation and correction of banknote image pixels by a micro control unit, is substituted with a process that the banknote compensation and correction data are obtained by the programmable logic device through accessing the static random access memory 15. After the scanning of the banknote, the banknote compensation and correction data are synchronously output to the micro control unit 11, and the micro control unit 11 receives the banknote compensation and correction data and recognizes the banknote. Compared with conventional technology, an amount of data to be processed by the micro control unit 11 is greatly reduced. Thus, with the device for recognizing and verifying banknotes provided according to the embodiment of the disclosure, not only a system performance of the micro control unit 11 is improved, but also a speed for processing the banknote image pixels is improved, thereby improving operation efficiency of the device for recognizing and verifying banknotes.

The embodiments of the present disclosure are described in a progressive manner and each embodiment places emphasis on the difference from other embodiments. Therefore, one embodiment can refer to other embodiments for the same or similar parts.

According to the description of the disclosed embodiments, the disclosure can be implemented or used by a person of skills in the art. Various modifications made to these embodiments may be obvious for persons of skills in the art, and a normal principle defined in the disclosure may be implemented in other embodiments without departing from the spirit or scope of the disclosure. Therefore the disclosure is not limited to the embodiments described herein but confirms to a widest scope in accordance with principles and novel features disclosed in the disclosure.

The invention claimed is:

1. A method for compensating and correcting an image, applied to a device for recognizing and verifying banknotes comprising a micro control unit, a programmable logic device connected to the micro control unit, an analog to digital (AD) chip, a drive circuit, and a static random access memory each connected to the programmable logic device, and a contact image sensor connected to the AD chip and the drive circuit respectively, wherein the static random access memory pre-stores a lookup table for compensation and correction; and the method comprises:

receiving, by the programmable logic device, a first configuration instruction output by the micro control unit, and controlling, by the programmable logic device, the drive circuit to drive the contact image sensor to collect first banknote image pixels;

converting, by the AD chip, the first banknote image pixels into second banknote image pixels through analog to digital conversion;

acquiring, by the programmable logic device, the second banknote image pixels, using, by the programmable logic device, values of the second banknote image pixels as address data, accessing, by the programmable logic device, the lookup table for compensation and correction pre-stored in the static random access memory, finding, by the programmable logic device, banknote compensation and correction data corresponding to the second banknote image pixels, and transmitting, by the programmable logic device, the banknote compensation and correction data to the micro control unit; and recognizing, by the micro control unit, the banknotes based on the banknote compensation and correction data, wherein a process of creating the lookup table for compensation and correction pre-stored in the static random access memory comprises:

receiving, by the programmable logic device, a second configuration instruction output by the micro control unit, and controlling, by the programmable logic device, the drive circuit to drive the contact image sensor to collect first original image pixels;

converting, by the AD chip, the first original image pixels into second original image pixels through analog to digital conversion;

receiving, recording and storing, by the programmable logic device, the second original image pixels, and transmitting the second original image pixels to the micro control unit; and receiving, by the micro control unit, the second original image pixels, acquiring compensation and correction data corresponding to the second original image pixels according to a compensation and correction formula, creating the lookup table for compensation and correction with the compensation and correction data, and storing the lookup table for compensation and correction into the static random access memory, and wherein the contact image sensor collecting the first original image pixels, the AD chip converting the first original image pixels into second original image pixels, and the programmable logic device receiving and recording the second original image pixels, comprises:

acquiring, by the contact image sensor, black-level outputs of the first original image pixels by scanning black calibration paper, and converting, by the AD chip, the black-level outputs of the first original image pixels into black-level outputs of the second original image pixels through analog to digital conversion;

acquiring, by the contact image sensor, white-level outputs of the first original image pixels by scanning white calibration paper, and converting, by the AD chip, the white-level outputs of the first original image pixels into white-level outputs of the second original image pixels through analog to digital conversion;

receiving, by the programmable logic device, the black-level outputs of the second original image pixels, and recording the black-level outputs of the second original image pixels as SB(i), i=0~N−1, where N is a total number of the original pixels of the contact image sensor, and i is a serial number of the original pixel; and receiving, by the programmable logic device, the white-level outputs of the second original image pixels and recording the white-level outputs of the second original image pixels as SW(i), i=0~N−1, where N is a total number of the original pixels of the contact image sensor, and i is a serial number of the original pixel.

2. The method for compensating and correcting an image according to claim 1, wherein the receiving, by the micro control unit, the second original image pixels, acquiring compensation and correction data corresponding to the second original image pixels according to a compensation and correction formula, and creating the lookup table for compensation and correction with the compensation and correction data, comprises:

receiving, by the micro control unit, the black-level outputs SB(i) of the second original image pixels and the white-level outputs SW(i) of the second original image pixels;

acquiring, by the micro control unit, N compensation and correction coefficients K(i) according to a coefficient calculation formula K(i)=[SW(i)−SB(i)]/255; and acquiring, by the micro control unit, all compensation and correction data corresponding to the second original image pixels according to a compensation and correction formula Y(i)=K(i)*[X(i)−SB(i)], and creating, by the micro control unit, the lookup table for compensation and correction with the compensation and correction data, wherein X(i) represents a value for the original image, and Y(i) represents a corrected value.

3. The method for compensating and correcting an image according to claim 1, further comprising recognizing, by the micro control unit, the banknote according to the banknote compensation and correction data, and transmitting a banknote recognition result to an upper computer connected to the micro control unit.

4. A device for recognizing and verifying banknotes, comprising:

a micro control unit, an AD chip, configured to perform analog to digital conversion on received data;

a drive circuit;

a contact image sensor which is connected to the AD chip and the drive circuit respectively, and is configured to be driven by the drive circuit to collect pixels of an image, and transmit the pixels of the image to the AD chip;

a static random access memory pre-storing a lookup table for compensation and correction; and a programmable logic device which is connected to the micro control unit, the AD chip, the drive circuit and the static random access memory respectively, and is configured to receive a first configuration instruction output by the micro control unit, control the drive circuit to drive the contact image sensor to collect first banknote image pixels, acquire second banknote image pixels obtained by the AD chip through performing analog to digital conversion on the first banknote image pixels, use values of the second banknote image pixels as address data, access the lookup table for compensation and correction pre-stored in the static random access memory, find banknote compensation and correction data corresponding to the second banknote image pixels, and transmit the banknote compensation and correction data to the micro control unit, and the micro control unit is configured to recognize the banknotes based on the banknote compensation and correction data, wherein the AD chip is configured to convert first original image pixels into second original image pixels through analog to digital conversion;

the programmable logic device is configured to receive a second configuration instruction output by the micro control unit, control the drive circuit to drive the contact image sensor to collect the first original image pixels; and receive, record and store the second original image pixels, and transmit the second original image pixels to the micro control unit; and the micro control unit is configured to receive the second original image pixels, acquire compensation and correction data corresponding to the second original image pixels according to a compensation and correction formula, create the lookup table for compensation and correction with the compensation and correction data, and store the lookup table for compensation and correction into the static random access memory, and wherein the contact image sensor is configured to acquire black-level outputs of the first original image pixels by scanning black calibration paper; and acquire white-level outputs of the first original image pixels by scanning white calibration paper, the AD chip is configured to convert the black-level outputs of the first original image pixels into black-level outputs of the second original image pixels through analog to digital conversion, and is configured to convert the white-level outputs of the first original image pixels into white-level outputs of the second original image pixels through analog to digital conversion, and the programmable logic device is configured to receive the black-level outputs of the second original image pixels, and record the black-level outputs of the second original image pixels as SB(i), i=0~N−1, where N is a total number of the original pixels of the contact image sensor, and i is a serial number of the original pixel; and receive the white-level outputs of the second original image pixels and record the white-level outputs of the second original image pixels as SW(i), i=0~N−1, where N is a total number of the original pixels of the contact image sensor, and i is a serial number of the original pixel.

5. The device for recognizing and verifying banknotes according to claim 4, wherein the micro control unit is configured to receive the black-level outputs SB(i) of the second original image pixels and the white-level outputs SW(i) of the second original image pixels; acquire N compensation and correction coefficients K(i) according to a coefficient calculation formula K(i)=[SW(i)−SB(i)]/255; and acquire compensation and correction data corresponding to the second original image pixels according to a compensation and correction formula Y(i)=K(i)*[X(i)−SB(i)] to create the lookup table for compensation and correction, wherein X(i) represents a value of the original image, and Y(i) represents a corrected value.

6. The device for recognizing and verifying banknotes according to claim 4, further comprising:

an upper computer which is connected to the micro control unit and is configured to receive a banknote recognition result output by the micro control unit.

\* \* \* \* \*